United States Patent
Anschutz et al.

(10) Patent No.: US 8,457,119 B2
(45) Date of Patent: *Jun. 4, 2013

(54) METHODS, SYSTEMS, AND COMPUTER PROGRAM PRODUCTS FOR ROUTING TRAFFIC BETWEEN NODES IN A NETWORK THAT ARE CONNECTED BY REDUNDANT LINKS

(75) Inventors: Thomas Arnold Anschutz, Conyers, GA (US); James William Rembert, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 180 days.

This patent is subject to a terminal disclaimer.

(21) Appl. No.: 12/241,530

(22) Filed: Sep. 30, 2008

(65) Prior Publication Data
US 2009/0034541 A1 Feb. 5, 2009

Related U.S. Application Data

(63) Continuation of application No. 10/747,753, filed on Dec. 29, 2003, now Pat. No. 7,460,517.

(51) Int. Cl.
*H04L 12/66* (2006.01)

(52) U.S. Cl.
USPC .......................................... 370/356; 370/409

(58) Field of Classification Search
None
See application file for complete search history.

(56) References Cited

U.S. PATENT DOCUMENTS

| | | | |
|---|---|---|---|
| 6,438,100 B1 * | 8/2002 | Halpern et al. | 370/218 |
| 6,442,169 B1 | 8/2002 | Lewis | |
| 6,678,264 B1 | 1/2004 | Gibson | |
| 6,886,043 B1 | 4/2005 | Mauger et al. | |
| 6,950,398 B2 | 9/2005 | Guo et al. | |
| 7,161,946 B1 | 1/2007 | Jha | |
| 7,564,840 B2 * | 7/2009 | Elliott et al. | 370/356 |
| 8,199,638 B2 * | 6/2012 | Taylor et al. | 370/228 |
| 2002/0052915 A1 * | 5/2002 | Amin-Salehi | 709/203 |
| 2003/0112749 A1 | 6/2003 | Hassink et al. | |

* cited by examiner

*Primary Examiner* — Kevin C Harper
(74) *Attorney, Agent, or Firm* — Myers Bigel Sibley & Sajovec, P.A.

(57) ABSTRACT

A communications network is operated by providing a plurality of redundant links between a first network node and a second network node. A first identifier is associated with a first one of the plurality of redundant links and a second identifier is associated with a second one of the plurality of redundant links. The first and second identifiers are associated with the regulatory constraint. Traffic that is marked with the first identifier is routed to the first one of the plurality of redundant links and traffic that is marked with the second identifier is routed to the second one of the plurality of redundant links so that operation of the communications network is in compliance with the regulatory constraint.

4 Claims, 4 Drawing Sheets

METHODS, SYSTEMS, AND COMPUTER PROGRAM PRODUCTS FOR ROUTING TRAFFIC BETWEEN NODES IN A NETWORK THAT ARE CONNECTED BY REDUNDANT LINKS

RELATED APPLICATION

This application is a continuation of U.S. patent application Ser. No. 10/747,753, filed Dec. 29, 2003, now U.S. Pat. No. 7,460,517, the disclosure of which is hereby incorporated herein by reference.

FIELD OF THE INVENTION

The present invention relates to communication networks, and, more particularly, to communication networks that use constraint based routing, such as multiprotocol label switching (MPLS) communication networks.

BACKGROUND OF THE INVENTION

Multiprotocol label switching (MPLS) provides a technique for routing packet data based on a label field rather than a destination address. An MPLS network comprises a set of nodes, which are called label switched routers (LSRs), that switch/route packets based on a label that has been added to each packet. Labels are used to define a flow of packets between two nodes or, if packets are being broadcast in a multicast operation, between a source node and multiple destination nodes. A specific path through the LSRs called a label switched path (LSP) is defined for each distinct flow, which is called a forwarding equivalence class (FEC). At intervening nodes in an LSP, an LSR may route the packet based on the MPLS label value, remove the MPLS label (pop a label), and/or impose an additional label (push a label). The label may be removed at the node from the packet at a node that is just prior to the destination node in a particular LSP. This process is sometimes referred to as "penultimate hop popping."

Referring now to FIG. 1, an exemplary MPLS label and Internet Protocol (IP) packet are illustrated. The MPLS label is a 32-bit header that includes a 20-bit label field, a 3-bit Exp field that is reserved for experimental use, a 1-bit S field that is set to one for the oldest entry in the stack and zero for all other entries, and an 8-bit time-to-live (TTL) field that may be used to encode a hop count or time-to-live value. An MPLS label may also be referred to as an MPLS shim header. As shown in FIG. 1, multiple MPLS labels or shim headers may be included in a single IP packet. The MPLS labels or shim headers are organized as a last-in, first-out stack and are processed based on the top MPLS label or shim header. As discussed above, an LSR may add an MPLS label or shim header to the stack (push operation) or remove an MPLS label or shim header from the stack (pop operation).

In IP networks, packets are routed according to the address using a routing algorithm that typically selects the least number of "hops" to the destination. Other packet or cell networks, for example, may use similar routing algorithms for establishing connections rather than for routing each and every packet individually. Although such routing algorithms may be efficient in routing packet traffic to a destination, business considerations or regulations may require that other, less efficient, traffic routing be used.

For example, by law, a Bell Operating Company (BOC) is allowed to provide exchange telecommunications and exchange access services only within a geographic region known as a local access and transport area (LATA). Traffic that spans LATAs must be carried by an Inter-Exchange Carrier (IEC). Moreover, BOCs are required to allow their customers to select the IEC that they desire to carry their inter-LATA traffic. Unfortunately, conventional packet routing algorithms do not typically take into account a customer's selection for inter-LATA traffic carrier.

SUMMARY OF THE INVENTION

According to some embodiments of the present invention, a communications network is operated by providing a plurality of redundant links between a first network node and a second network node. A first identifier is associated with a first one of the plurality of redundant links and a second identifier is associated with a second one of the plurality of redundant links. The first and second identifiers are associated with a regulatory constraint. Traffic that is marked with the first identifier is routed to the first one of the plurality of redundant links and traffic that is marked with the second identifier is routed to the second one of the plurality of redundant links so that operation of the communications network is in compliance with the regulatory constraint.

In other embodiments of the present invention, the communications network is a multiprotocol label switching network, the traffic comprises packet traffic, and the first identifier is a first MPLS label and the second identifier is a second MPLS label.

In still other embodiments of the present invention, the first node is associated with a first local access and transport area (LATA) and the second node is associated with a second LATA.

In further embodiments of the present invention, the first one of the plurality of redundant links is associated with a first inter-exchange carrier (IEC) and the second one of the plurality of redundant links is associated with a second IEC.

In still further embodiments of the present invention, a portion of the traffic is associated with a customer. A selection of the first IEC is received from the customer and the traffic associated with the customer is marked with the first identifier.

In still further embodiments of the present invention, a portion of the traffic is associated with a customer. At least one routing criterion is received from the customer and the traffic associated with the customer is marked with the first identifier or the second identifier based on the at least one routing criterion.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
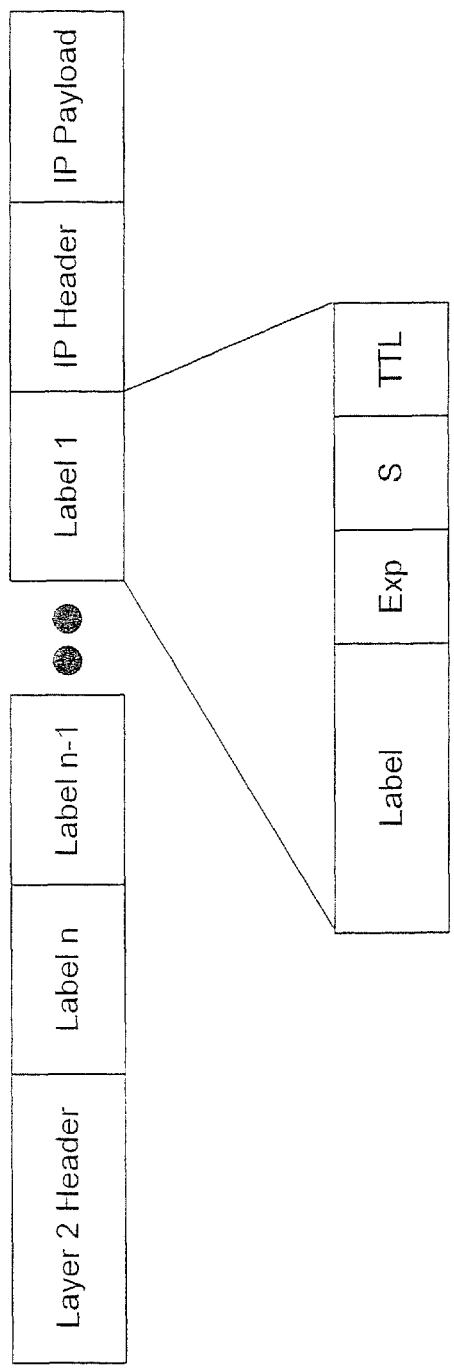
FIG. 1 is a block diagram that illustrates a conventional multiprotocol label switching (MPLS) label or shim header and internet protocol (IP) packet.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

Embodiments of the present invention are described herein in the context of a multiprotocol label switching (MPLS) network. It will be understood, however, that the present invention is not limited to MPLS technology. On the contrary, the present invention may be practiced using other types of constraint based routing technologies in accordance with various types of embodiments of the present invention. Moreover, embodiments of the present invention are described herein in the context of using constraint based routing technology to facilitate compliance equal-access regulatory constraints in a communications network. Equal-access regulatory constraints may refer to those regulations on Bell Operating Companies and/or other telephone companies that require the BOCs/telephone companies to allow their customers to reach the Inter-Exchange Carrier (IEC) of their choice for carrying their inter-local access and transport area (LATA) traffic. These regulations may be referred to as equal-access regulations.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Figure 2:
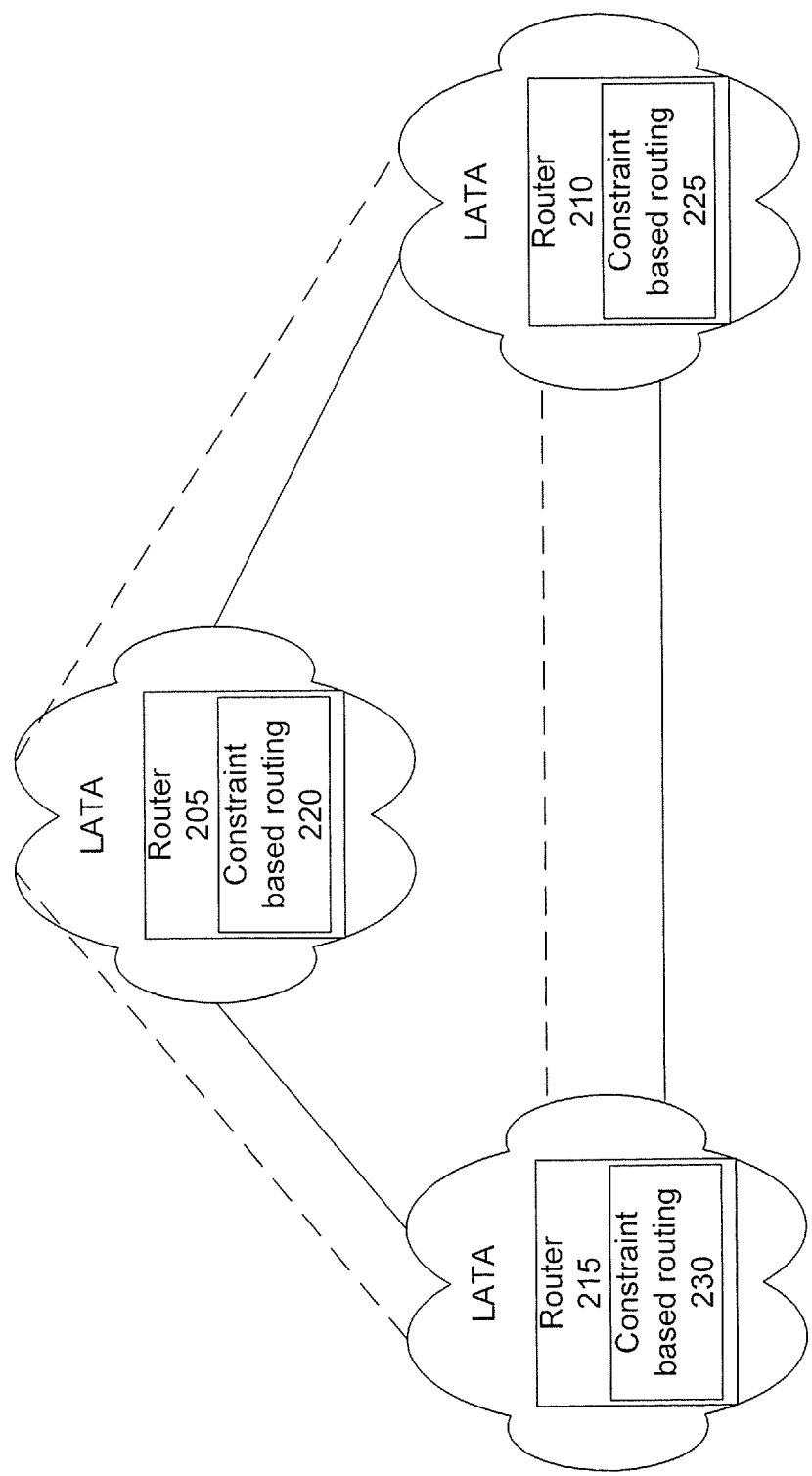
FIG. 2 is a block diagram that illustrates an MPLS network in accordance with some embodiments of the present invention.

Referring now to FIG. 2, a communication network, in accordance with some embodiments of the present invention, comprises a plurality of local access and transport areas (LATAs) as shown. The LATAs may comprise numerous routers and links to service customers in a particular geographic region. The LATAs may also comprise one or more routers that are configured to route traffic to destinations in other LATAs. As discussed above, traffic that spans LATAs must be carried by an inter-exchange carrier (IEC) by law. Thus, the various LATAs shown in FIG. 2 comprise routers 205, 210, and 215 that are configured with constraint based routing modules 220, 225, and 230, respectively. The constraint based routing modules 220, 225, and 230 may be configured to route traffic to a particular link that connects two LATAs. For example, as shown in FIG. 2, each of the three LATAs is connected to the other two LATAs by two redundant links. One of these redundant links may be associated with a first IEC while the other link may be associated with a second IEC. It will be understood that various numbers of redundant links may be used in accordance with various embodiments of the present invention. In particular embodiments, the constraint based routing modules 220, 225, and 230 may be configured to implement a constraint based routing protocol, such as, for example, the type specified for use in a multiprotocol label switching (MPLS) network by IETF RFC 2702 Section 7.

Although FIG. 2 illustrates an exemplary communication network, it will be understood that the present invention is not limited to such configurations, but is intended to encompass any configuration capable of carrying out the operations described herein. It will be appreciated that, in accordance with some embodiments of the present invention, the functionality of constraint based routing modules 220, 225, and 230 may be implemented using discrete hardware components, one or more application specific integrated circuits (ASICs), a programmed digital signal processor or microcontroller, a program stored in a memory and executed by a processor, and/or combinations thereof. In this regard, computer program code for carrying out operations of the constraint based routing modules 220, 225, and 230 may be written in a high-level programming language, such as C or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage.

The present invention is described hereinafter with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 3:
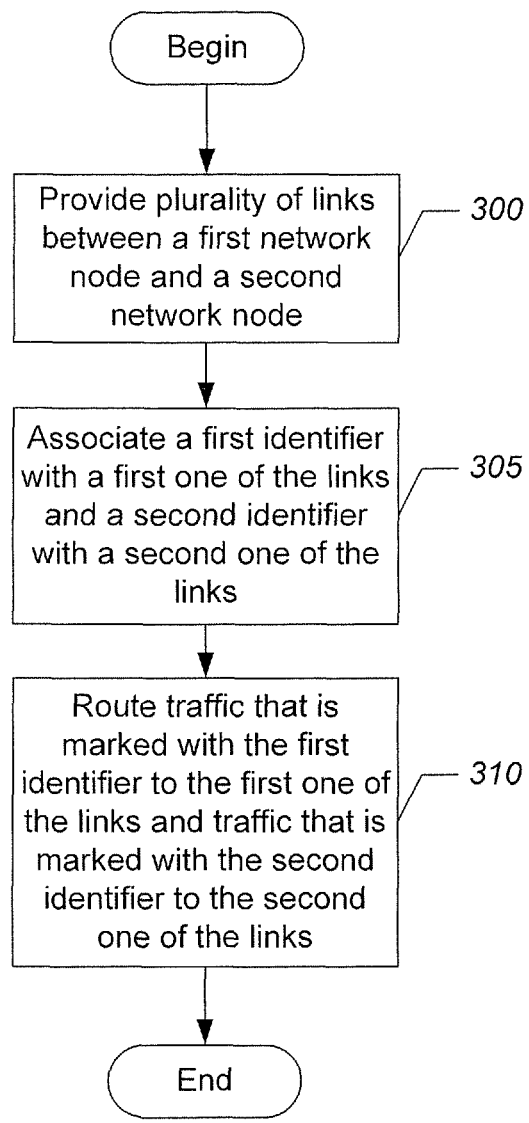
FIGS. 3 and 4 are flowcharts that illustrate operations for routing traffic between nodes in a network that are connected by redundant links in accordance with some embodiments of the present invention.

Operations for routing traffic between nodes in a network that are connected by redundant links in accordance with some embodiments of the present invention, will now be described with reference to FIGS. 3 and 2. Referring now to FIG. 3, operations begin at block 300 where a plurality of redundant links are provided between a first network node and a second network node, such as, for example, between the routers 205, 210, and 215 in the LATAs shown in FIG. 2. A first identifier is associated with a first one of the plurality of redundant links and a second identifier is associated with a second one of the plurality of redundant links at block 310. In accordance with some embodiments of the present invention, the first identifier may be a first MPLS label and the second identifier may be a second MPLS label. A router equipped with a constraint based routing module 220, 225, or 230 may route traffic that is marked with the first identifier to the first one of the plurality of redundant links and the traffic that is marked with the second identifier to the second one of the plurality of redundant links at block 315.

Advantageously, by using constraint based routing technology to associate identifiers with particular transport links and then assigning traffic to certain links based on whether they carry a particular identifier may allow a service provider to comply with regulations, such as equal access regulation with regard to customer selection of an IEC. Traditional routing algorithms do not establish a customer's long distance (inter-LATA) carrier choice nor do they select a route based on the owner of a particular facility or link. Embodiments of the present invention may allow a customer to select an IEC as their inter-LATA or long distance provider and then the customer's traffic may be marked with the identifier associated with that IECs links in the communication network.

Figure 4:
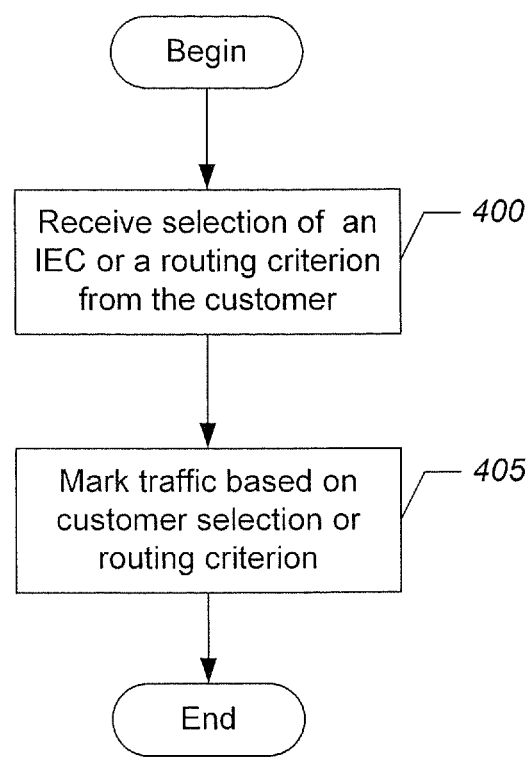

Referring now to FIG. 4, a customer's traffic may be associated with a particular IEC or redundant link by receiving a selection from the customer of a particular IEC or one or more routing criterion that a router may use in identifying a particular link out of a set of redundant links at block 405. At block 410, the traffic associated with the customer may be marked with the identifier associated with a particular IEC or redundant link or the traffic may be marked based on the particular routing criterion provided by the customer.

Thus, embodiments of the present invention may provide equal access to packet data networks for customers through use of constraint based routing technology, such as MPLS. In particular, routing may be based on a regulatory model instead of or in addition to traditional engineering constraints.

The flowcharts of FIGS. 3 and 4 illustrate the architecture, functionality, and operations of some embodiments of methods, systems, and computer program products for routing traffic between nodes in a network that are connected by redundant links in accordance with some embodiments of the present invention. In this regard, each block represents a module, segment, or portion of code, which comprises one or more executable instructions for implementing the specified logical function(s). It should also be noted that in other implementations, the function(s) noted in the blocks may occur out of the order noted in FIGS. 3 and 4. For example, two blocks shown in succession may, in fact, be executed substantially concurrently or the blocks may sometimes be executed in the reverse order, depending on the functionality involved.

Many variations and modifications can be made to the embodiments described herein without substantially departing from the principles of the present invention. All such variations and modifications are intended to be included herein within the scope of the present invention, as set forth in the following claims.

That which is claimed:

1. A method of operating a communications network, comprising:
    providing a plurality of redundant links between a first network node and a second network node;
    associating a first identifier with a first one of the plurality of redundant links and a second identifier with a second one of the plurality of redundant links, the first and second identifiers being associated with a regulatory constraint, the regulatory constraint comprising at least a portion of a public law enforceable by a governmental body; and
    routing traffic that is marked with the first identifier to the first one of the plurality of redundant links and traffic that is marked with the second identifier to the second one of the plurality of redundant links so that operation of the communications network is in compliance with the regulatory constraint;
    wherein the communications network is a multiprotocol label switching protocol network, wherein the traffic comprises packet traffic, and wherein the first identifier is a first multiprotocol label switching network label and the second identifier is a second multiprotocol label switching network label;
    wherein the first one of the plurality of redundant links is associated with a first inter-exchange carrier and the second one of the plurality of redundant links is associated with a second inter-exchange carrier and the first inter-exchange carrier and the second inter-exchange carrier are active simultaneously to carry the traffic between the first network node and the second network node; and
    wherein the multiprotocol label switching protocol used in the communications network is independent of packet transport protocols used by the first and second inter-exchange carriers, respectively.

2. The method of claim 1, wherein the first node is associated with a first local access and transport area and the second node is associated with a second local access and transport area.

3. A computer program product for operating a communications network, comprising:
    a non-transitory computer readable storage medium having computer readable program code embodied therein, the computer readable program code comprising:
    computer readable program code to provide a plurality of redundant links between a first network node and a second network node;
    computer readable program code to associate a first identifier with a first one of the plurality of redundant links and a second identifier with a second one of the plurality of redundant links, the first and second identifiers being associated with a regulatory constraint, the regulatory constraint comprising at least a portion of a public law enforceable by a governmental body; and computer readable program code to route traffic that is marked with the first identifier to the first one of the plurality of redundant links and traffic that is marked with the second identifier to the second one of the plurality of redundant links so that operation of the communications network is in compliance with the regulatory constraint;

wherein the communications network is a multiprotocol label switching protocol network, wherein the traffic comprises packet traffic, and wherein the first identifier is a first multiprotocol label switching network label and the second identifier is a second multiprotocol label switching network label;

wherein the first one of the plurality of redundant links is associated with a first inter-exchange carrier and the second one of the plurality of redundant links is associated with a second inter-exchange carrier and the first inter-exchange carrier and the second inter-exchange carrier are active simultaneously to carry the traffic between the first network node and the second network node; and wherein the multiprotocol label switching protocol used in the communications network is independent of packet transport protocols used by the first and second inter-exchange carriers, respectively.

4. The computer program product of claim 3, wherein the first node is associated with a first local access and transport area and the second node is associated with a second local access and transport area.

\* \* \* \* \*